(12) United States Patent
Engelbart et al.

(10) Patent No.: US 8,753,458 B2
(45) Date of Patent: Jun. 17, 2014

(54) MAPPING TOW SPLICES IN COMPOSITE STRUCTURES

(75) Inventors: Roger W. Engelbart, St. Louis, MO (US); Reed Hannebaum, Belleville, IL (US); Eric Rector, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 12/509,471

(22) Filed: Jul. 26, 2009

(65) Prior Publication Data

US 2011/0017380 A1   Jan. 27, 2011

(51) Int. Cl.
*B32B 41/00* (2006.01)

(52) U.S. Cl.
USPC .... 156/64; 356/237.1; 356/237.3; 356/237.4; 356/238.3

(58) Field of Classification Search
USPC ............. 156/64, 351, 361, 367, 378, 379; 356/237.1, 237.3, 237.4, 238.3
See application file for complete search history.

(56) References Cited

U.S. PATENT DOCUMENTS

| | | | |
|---|---|---|---|
| 6,799,619 B2 | 10/2004 | Holmes et al. | |
| 6,814,822 B2 | 11/2004 | Holmes et al. | |
| 6,871,684 B2 | 3/2005 | Engelbart et al. | |
| 6,940,295 B2 | 9/2005 | Engelbart et al. | |
| 7,039,485 B2 | 5/2006 | Engelbart et al. | |
| 7,171,033 B2 | 1/2007 | Engelbart et al. | |
| 7,193,696 B2 | 3/2007 | Engelbart et al. | |
| 7,236,625 B2 | 6/2007 | Engelbart et al. | |
| 7,253,908 B2 | 8/2007 | Vaccaro et al. | |
| 7,289,656 B2 | 10/2007 | Engelbart et al. | |
| 7,362,427 B2 | 4/2008 | Fayolle et al. | |
| 7,362,437 B2 | 4/2008 | Engelbart et al. | |
| 7,372,556 B2 | 5/2008 | Engelbart et al. | |
| 7,424,902 B2 | 9/2008 | Engelbart et al. | |
| 7,435,947 B2 | 10/2008 | Engelbart et al. | |
| 7,489,392 B2 | 2/2009 | Engelbart et al. | |
| 7,495,758 B2 | 2/2009 | Walton | |
| 7,576,850 B2 | 8/2009 | Engelbart et al. | |
| 7,626,692 B2 | 12/2009 | Engelbart et al. | |
| 7,678,214 B2 | 3/2010 | Engelbart et al. | |
| 7,688,434 B2 | 3/2010 | Engelbart et al. | |
| 7,712,502 B2 | 5/2010 | Engelbart et al. | |
| 7,769,224 B2 | 8/2010 | Engelbart et al. | |
| 7,889,907 B2 | 2/2011 | Engelbart et al. | |
| 7,978,328 B2 | 7/2011 | Engelbart et al. | |
| 7,983,469 B2 | 7/2011 | Engelbart et al. | |
| 2004/0031567 A1 | 2/2004 | Engelbart et al. | |
| 2004/0060650 A1 | 4/2004 | Holmes et al. | |

(Continued)

FOREIGN PATENT DOCUMENTS

WO   2005101144 A2   10/2005
WO   PCT/US2010/040088   12/2010

OTHER PUBLICATIONS

International Search Report dated Dec. 9, 2010, regarding Application No. PCT/US2010/040088 (WO 2011016922), 2 pages.

(Continued)

*Primary Examiner* — George Koch
(74) *Attorney, Agent, or Firm* — Yee & Associates, P.C.

(57) ABSTRACT

The three dimensional (3-D) locations of splices in pre-preg tows placed by an automatic fiber placement machine to form a laminated composite structure are mapped to allow visualization of alignment patterns in the splices.

11 Claims, 8 Drawing Sheets

(56) References Cited

U.S. PATENT DOCUMENTS

| | | | |
|---|---|---|---|
| 2004/0251920 A1 | 12/2004 | Engelbart et al. | |
| 2005/0025350 A1 | 2/2005 | Engelbart et al. | |
| 2005/0117793 A1 | 6/2005 | Engelbart et al. | |
| 2005/0203657 A1 | 9/2005 | Engelbart et al. | |
| 2005/0225753 A1 | 10/2005 | Engelbart et al. | |
| 2006/0017937 A1 | 1/2006 | Vaccaro et al. | |
| 2006/0108048 A1 | 5/2006 | Engelbart et al. | |
| 2006/0109454 A1 | 5/2006 | Engelbart et al. | |
| 2006/0152712 A1 | 7/2006 | Engelbart et al. | |
| 2007/0034313 A1 | 2/2007 | Engelbart et al. | |
| 2007/0095451 A1* | 5/2007 | Kramp | 156/64 |
| 2007/0096019 A1 | 5/2007 | Engelbart et al. | |
| 2007/0097359 A1 | 5/2007 | Engelbart et al. | |
| 2007/0229805 A1 | 10/2007 | Engelbart et al. | |
| 2008/0006102 A1* | 1/2008 | Engelbart et al. | 73/866 |
| 2008/0008380 A1 | 1/2008 | Engelbart et al. | |
| 2008/0055591 A1* | 3/2008 | Walton | 356/237.1 |
| 2008/0141777 A1 | 6/2008 | Engelbart et al. | |
| 2008/0259325 A1 | 10/2008 | Engelbart et al. | |
| 2008/0277042 A1 | 11/2008 | Engelbart et al. | |
| 2008/0278716 A1 | 11/2008 | Engelbart et al. | |
| 2008/0289742 A1 | 11/2008 | Engelbart et al. | |
| 2009/0000723 A1 | 1/2009 | Engelbart et al. | |
| 2009/0002693 A1 | 1/2009 | Engelbart et al. | |

OTHER PUBLICATIONS

Engelbart et al., "Mapping Tow Splices in Composite Structures," U.S. Appl. No. 13/467,160, filed May 9, 2012, 39 pages.

Preliminary amendment dated May 9, 2012, regarding U.S. Appl. 13/467,160, 6 pages.

Office Action, dated Mar. 4, 2013, regarding U.S. Appl. No. 13/467,160, 34 pages.

* cited by examiner

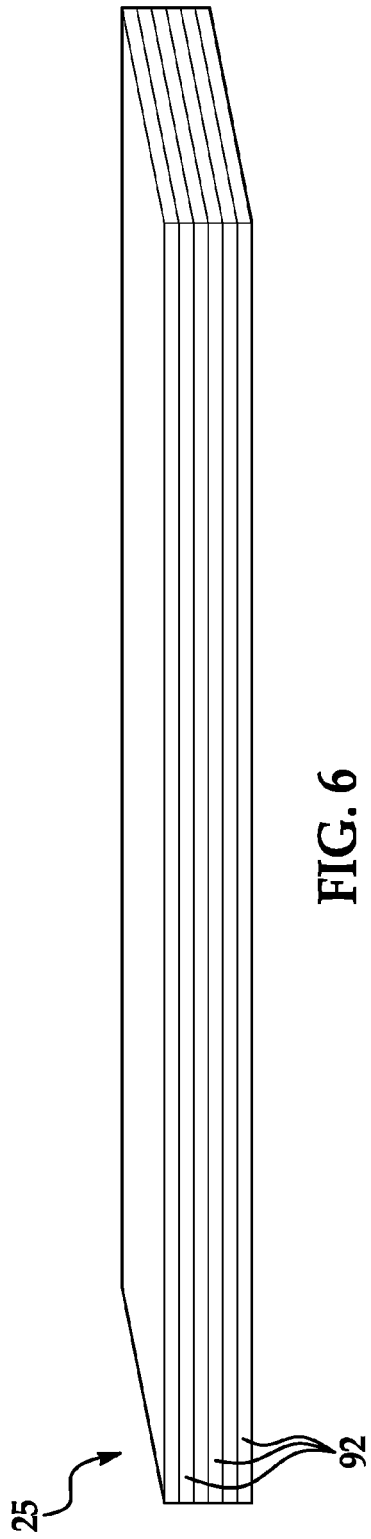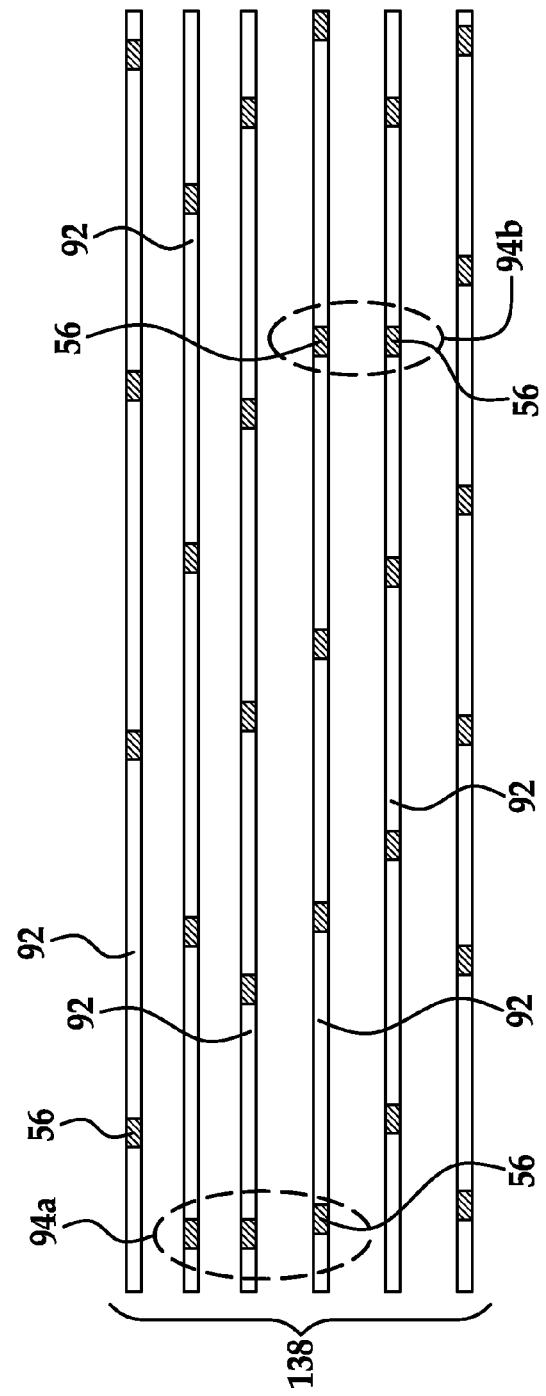

MAPPING TOW SPLICES IN COMPOSITE STRUCTURES

CROSS REFERENCE TO RELATED APPLICATIONS

This application claims the benefit of the priority date of a co-pending application U.S. Ser. No. 12/813,329, filed Jun. 10, 2010, published as 2010/030,3335 A1, entitled "Methods for Determining Inconsistency Characteristics of a Composite Structure", which is a Divisional application of U.S. Pat. No. 7,769,224, U.S. Ser. No. 11/832,853, filed on Aug. 2, 2007, published as 2008/0006102 A1 on Jan. 10, 2008, entitled "Systems and Methods for Determining Inconsistency Characteristics of a Composite Structure", each of which applications is incorporated by reference herein in its entirety.

TECHNICAL FIELD

This disclosure generally relates to automatic fiber placement systems used to fabricate composite structures, and deals more particularly with a method and apparatus for mapping the 3-D locations of composite tow splices within the structure.

BACKGROUND

Composite structures such as those used in the aerospace industries may be fabricated using automated fiber placement (AFP) machines that lay down relatively narrow strips of pre-impregnated tows or slit composite tape onto a manufacturing tool, such as a mandrel. AFP machines may include one or more tape application heads that simultaneously lay down a group of tows arranged side-by-side as a conformal band onto the tool. The tows are pulled from storage spools or creels carried on the placement head and are fed to one or more compaction rollers that apply and compress the tow band onto the tool or substrate surface.

The pre-preg tow being dispensed from a supply spool comprises a series of segments that are spliced together end-to-end by pressing the ends of the tow segments together. Since the fibers are not continuous at the location of a splice, a tow may be somewhat inherently weaker at the splice. However this weakness is not a defect and does not normally present a problem unless the splices in the laminate plies became undesirably aligned through the thickness of the structure. Alignment of splices through the laminate may affect the load bearing capability of the laminate structure, and thus are to be avoided if possible. Material suppliers often identify the location of splices in a tow by applying visible markings on the splice. While these markings visually identify the location of the splices along a tow and may be used in making a rough estimate of the number of splices in a laminate, it is not presently possible to determine when and where the splices may become aligned through the thickness of the laminate.

Accordingly, there is a need for a method and apparatus for 3-D mapping and displaying of the locations of splices within a laminate in order to allow visualization of potentially undesirable alignment of the splices.

SUMMARY

The disclosed embodiments provide a method and apparatus that allow visualization of undesirable alignments of tow splices in a composite laminate. Real-time, 3-D mapping and display of the splices permit prompt corrective action to be taken during the lay-up process so that alignment of tow splices in the completed laminate do not exceed allowed values. Detection and 3-D mapping of the tow splices is performed automatically during the tow placement process. The embodiments may be readily integrated into an automated laminate manufacturing process and are effective in automatically identifying areas of a laminate that may not meet engineering specifications due to undesired alignment of tow splices.

According to one disclosed embodiment, a method is provided for mapping the location of splices in tows used to lay-up a laminated composite structure. The method includes sensing the location of each splice as tows are being placed during the lay-up and generating a data file representing the 3-D location of splices in the structure. The data file is used to generate a 3-D display showing the 3-D location of the splices in the structure. Sensing the location of each splice may include optically sensing the presence of a feature on the tows that represents the location of the splice. The sensing process may be performed by illuminating the tows as they are being placed and optically sensing the presence of the feature using a camera.

According to another embodiment, a method is provided of laying up a composite structure comprising placing tows on a tool using an automatic placement machine and sensing splices in each of the tows as the tows are being placed. The location of each splice is recorded as the splice is sensed and a 3-D image of the structure showing the 3-D locations of the splice is generated based on the recorded locations of the splices. Placement of the tows may include simultaneously placing a plurality of the tows on the tool as a band, and sensing the splices may include sensing splices in each of the tows of the band as it is placed on the tool. Recording the location of each splice may include recording the two dimensional position of the splices in each of a plurality of plies laid up on the tool by the machine.

According to a further embodiment, apparatus is provided for mapping the location of splices in tows placed by an automatic fiber placement machine. The apparatus includes means for detecting the splices as each of the tows is being placed by the machine, and means for recording the location of each of the detected splices. The apparatus further includes means for generating a 3-D display of the structure showing the location of the splices. The detecting means may include means for illuminating the tows as the toes are being placed and sensing means for sensing the presence of each of the splices illuminated by the illuminating means. The sensing means may include a camera adapted to be mounted on the placement machine and oriented to image an area of the tows immediately after they are placed on the tool. The apparatus may further include a software program used by a computer to generate a 3-D data file representing a 3-D image of the structure showing the location of the splices in the structure.

According to still another embodiment, apparatus is provided for mapping the 3-D location of splices in pre-preg tows placed by automatic fiber placement machine to form a laminated composite structure. The apparatus comprises at least one sensor for sensing a splice as a tow is being placed and a computer coupled with the sensor for calculating the 3-D position within the structure of each of the splices sensed by the sensor. The apparatus also includes a display coupled with a computer for displaying an image showing the 3-D position of the splices in the structure.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

FIG. 6 is a side view illustration of laminated plies laid up by the AFP machine shown in FIG. 1.

FIG. 7 is a cross sectional illustration of the lay-up shown in FIG. 6 but wherein the plies have been exploded, and showing the location of splices through the thickness of the lay-up, including potential adverse alignment of splices.

DETAILED DESCRIPTION

Figure 1:
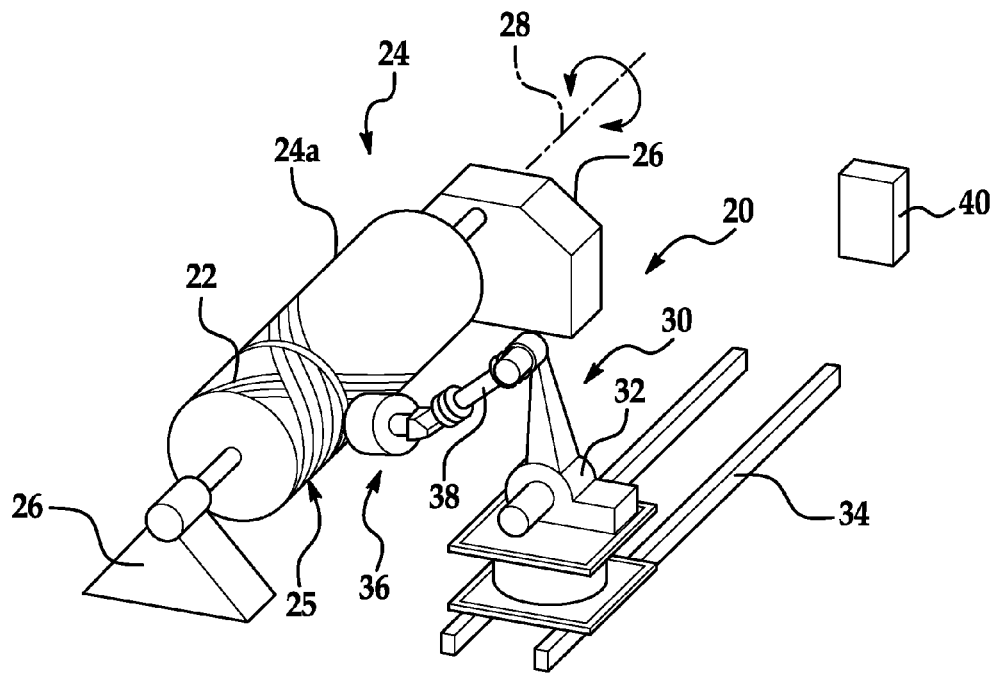
FIG. 1 is a perspective illustration of an automatic fiber placement (AFP) machine laying up a composite laminate structure.
Figure 2:
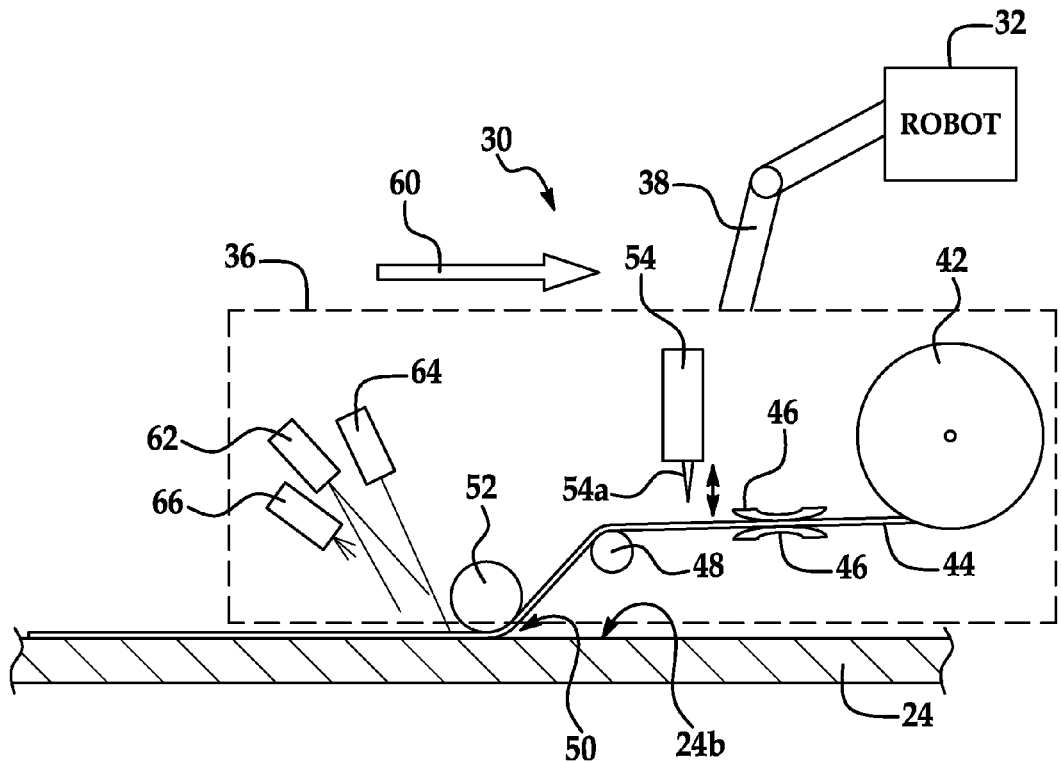
FIG. 2 is a diagrammatic illustration of an application head forming part of the AFP machine shown in FIG. 1.

Referring first to FIGS. 1 and 2, an automated composite structure layup operation, generally indicated by the numeral 20, may be used to fabricate a laminated composite structure 25 by laying up bands 22 of fiber reinforced pre-preg tows 44, such as, without limitation, carbon epoxy fiber tows, over a tool 24. In the illustrated example, the tool 24 comprises a cylindrical mandrel 24a mounted on supports 26 for rotation about its central axis 28, however a wide range of other tools are possible. As will be discussed below, multiple plies of the tow bands 22 may be laid up on the mandrel 24a, allowing various patterns of courses, ramps and contoured features to be laid down. Although the disclosed embodiments will be described in connection with the placement of tows 44 having widths such as one-eighth inch or one-quarter inch, tapes that contain splices, including those having widths such as, without limitation, three inches or six inches or twelve inches, are contemplated.

The bands 22 are placed or laid down on the mandrel 24a by an AFP machine generally indicated by the numeral 30 which, in the illustrated example, includes a tow application head 36 mounted on the arm 38 of a robot 32. The application head 36 simultaneously lays down multiple, parallel, substantially contiguous strips of tows 44 (also sometimes referred to as a courses) to form each band 22. The robot 32 is mounted on rails 34 to allow the robot 32 to traverse the length of the mandrel 24a. Operation of the AFP machine 30, including operation of the application head 36 is controlled by a controller 40 which may comprise a NC (numeric control), CNC (computer numeric control) or other type of controller programmed to operate the AFP machine 30.

Figure 3:
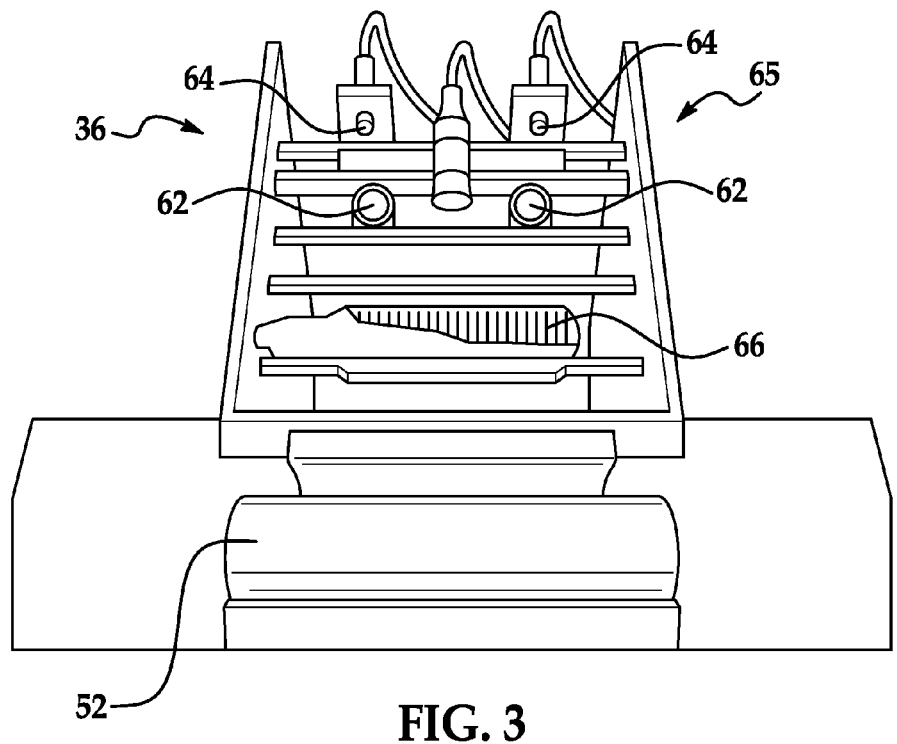
FIG. 3 illustrates a front view of the placement head shown in FIG. 2.

Referring now to FIGS. 2 and 3, the application head 36 (FIG. 2) includes at least one, and up to thirty-two or more creels or spools 42 of tows 44 which are drawn through various guides 46 and rollers 48 into a nip 50 between the surface 24b of the tool 24 and a compaction roller 52. Movement of the head 36 in the direction of the arrow 60, as controlled by the robot 32, draws the tows 44 from the spools 42 as the compaction roller 52 forces the tows 44 down onto the tool surface 24b. The application head 36 further includes a cutter mechanism 54 associated with each of the spools 42 which includes a cut-off blade 54a that severs the corresponding tow 44 to a desired length. The cutter mechanisms 54a are independently controllable so as to permit each of the tows 44 in a band 22 to be cut to a desired length. Additional details of a typical AFP machine 30 including an application head 36 are disclosed in U.S. Pat. No. 4,699,683 and U.S. Patent Application Publication Number 20060180264A1 published Aug. 17, 2006, the entire disclosures of which are incorporated by reference herein.

Figure 4:
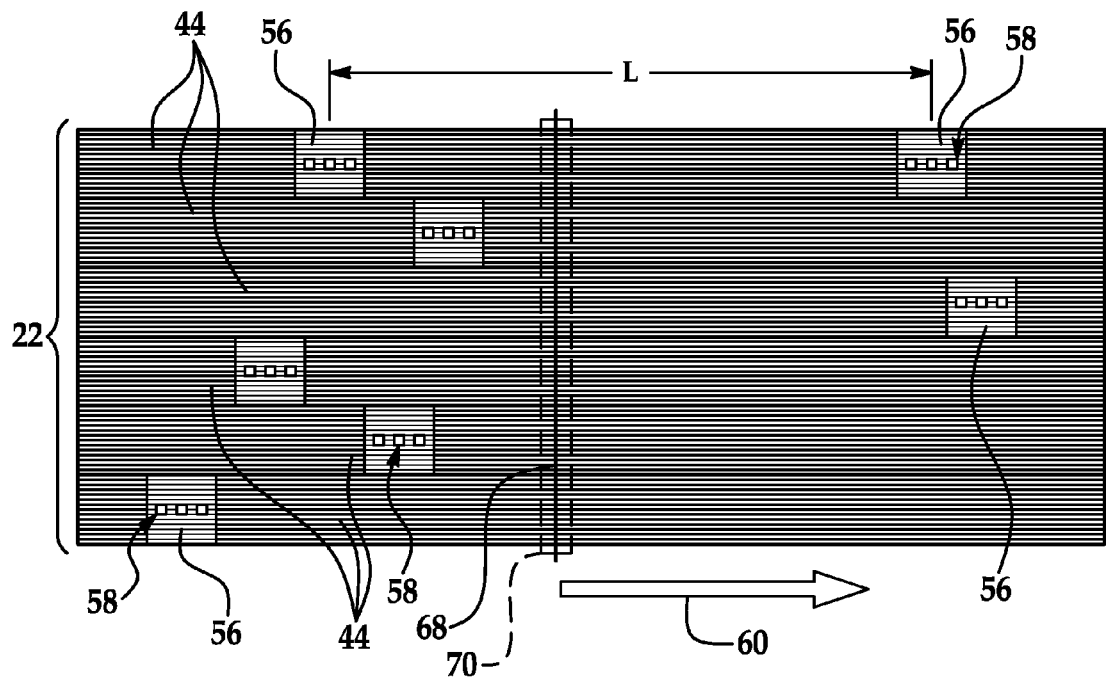
FIG. 4 illustrates a plan view of a typical tow band applied by the placement head shown in FIG. 2 and illustrating the location of splices in each tow.

Referring particularly now to FIG. 4, each of the tows 44 may include splices 56 located along their lengths that are spaced apart from each other by a distance L which may or may not be a constant value. The splices 56 represent joints, typically lap joints, that are formed between individual segments of tows that are joined by any of various techniques, such as by pressing overlapping ends of the segments together to form a continuous tow 44. Although the splices 56 are shown as highlighted areas in the tow band 22 shown in FIG. 4, these splices 56 may not be readily seen by the naked eye. Thus, features such as markings or indicia 58 may be applied to each tow 44 in the area of a splice 56 in order to designate areas in the tow 44 containing a splice 56.

In the illustrated embodiment, the features 58 are visual markings in the form of three aligned squares, which may have a color contrasting with the tow material, however a variety of other shapes, colors and placements for the marking are possible. Furthermore, while the features 58 shown in FIG. 3 are intended to be visibly detectable by optical sensing devices, it may be possible to mark the location of the splices 56 using other techniques, such as, for example and without limitation, magnetic or nonmagnetic elements that are applied to the surface or which may be embedded in the tows 44, and which may be sensed or detected using other than optical techniques.

In accordance with the disclosed embodiments, the location of each of the splices 56 is sensed and recorded immediately after it has been placed on a surface 24a of the tool 24. One technique for sensing the location of the splices 56 involves the use of one or wore cameras 62 (FIG. 2) which may comprise a high resolution solid state array or other optical sensing means that may be used to detect the presence of the features 58 which are indicative of a splice 56. The cameras 62 may be oriented to view an imaging strip 70 extending transversely across the tow band 22 immediately after the tows 44 are placed and compacted by the compaction roller 52. One or more lasers 64 may be used to illuminate a line 68 extending across the tow band 22 within the imaging strip 70. Optionally, a general source of illumination 66 may also be provided to illuminate the general area around the imaging strip 70.

The cameras 62, lasers 64 and general illumination source 66 form a machine vision system 65 that may also be employed to perform other tasks, such as detecting inconsistencies in the placement of the tows 44 as well as the presence of FOD (foreign objects and debris). Commercially available software packages using standard imaging processing routines such as edge detection can be utilized to detect features 58 indicating the presence of a splice 56.

FIG. 3 illustrates one arrangement for mounting the cameras 62, lasers 64 and illumination source 66 on the application head 36. It may be possible, however, to mount the cameras 62, laser 64 and illumination source 66 on the robotic arm 38 so that they are constantly oriented to illuminate and optically image the tow band 22 immediately after it is placed on the tool 24. The cameras 62 may record digital images of the same area of the imaging strip 70 in order to create a 3-D image, or alternatively, may record separate images of two adjacent sections of the strip 70. The cameras 62 may record either continuous or intermittent images of the tows 44, beginning at the point at which the tows 44 are first brought into contact with the tool surface 24b and ending after the tows 44 have been fully placed. In the illustrative embodiment shown in FIG. 3, two lasers 64 are employed to form the laser line 68.

Figure 5:
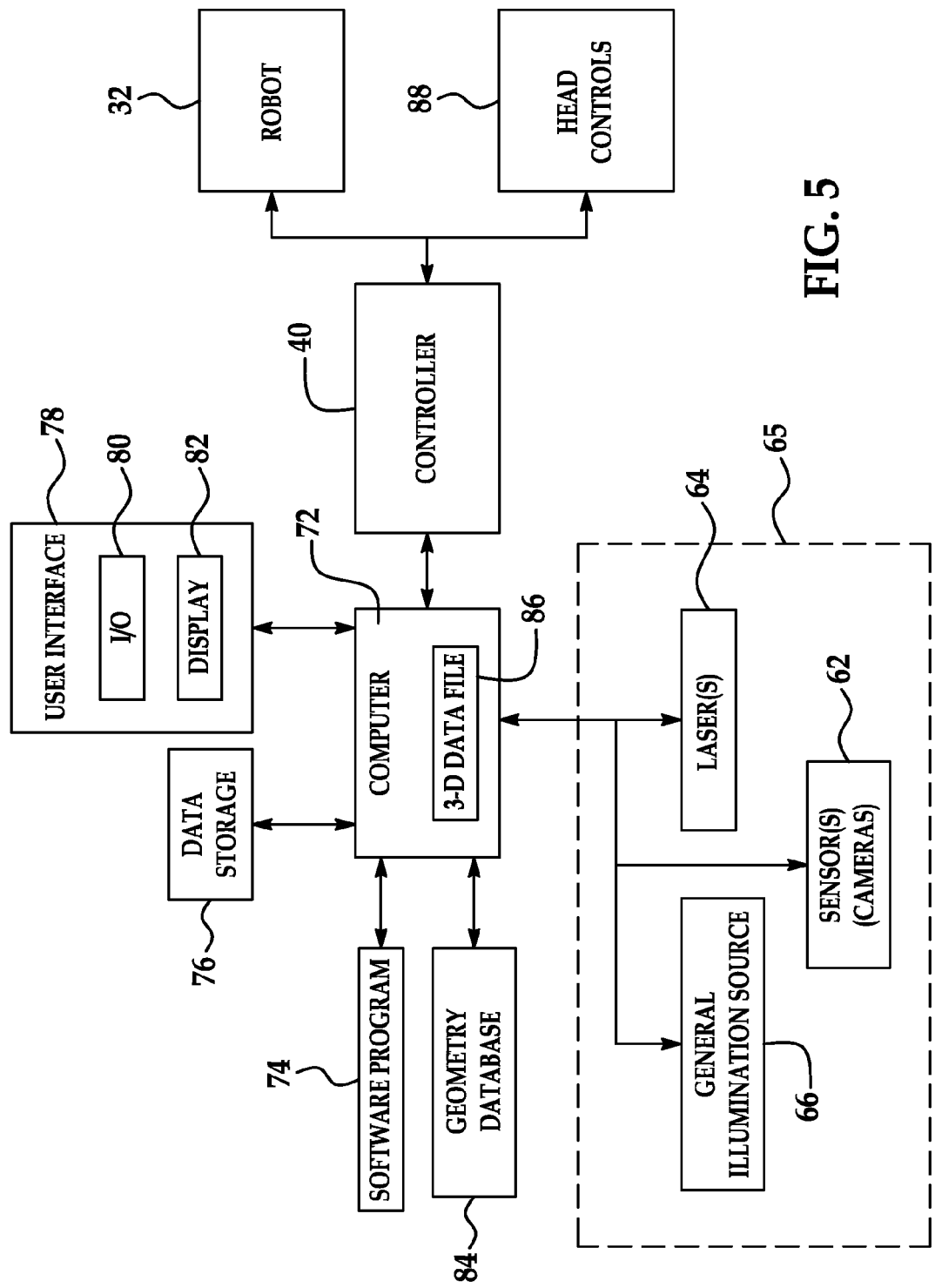
FIG. 5 is a block diagram illustration of apparatus for 3-D mapping of tow splices.

Attention is now directed to FIG. 5 which broadly illustrates components forming an apparatus for mapping tow splices in laminated composite structures. The laser 64, cameras or other sensors 62 and the illumination source 66 forming the machine vision system 65 are controlled by a computer 72 which receives image information, typically in digital form, from the cameras 62. The computer 72 employs a software program 74 to create a 3-D data file 86 that represents a 3-n image display of the structure 25 showing 3-D location of the splices 56 within the structure 25. The computer 72 generates the 3-D data file 86 by retrieving geometry information from a database 84 that defines the geometry of the structure 25, including its ply make-up. Using the geometry information retrieved from the database 84, the computer 72 calculates the location of each of the splices 56 sensed by the camera sensors 62 in terms of its 3-D coordinates (x,y,z) within the structure 25, including the location of each sensed splice 56 within a corresponding ply.

The computer 72 may be coupled with a user interface 78 that includes one or more input/output devices 80 as well as a display 82 used to display various later discussed screens that include display images based on the 3-D data file 86. The user interface display 82 may be used to display, in real time an area of a tow band 22 (FIG. 4) under inspection as well as pass/fail status and the criteria being employed in the inspection process. The user interface 78 also permits the selection or alteration of inspection parameters for various phases of the inspection process. Suitable data storage 86 may be coupled with the computer 72 for storing archival information, such as maps of tow splices previously recorded. The computer 72 may be coupled with the controller 40 which operates the robot 32 as well as to head controls 88 on the application 36 head. The computer 72 may coordinate the operation of the machine vision system 65 with the operation of the application head 36, while allowing a user to alter the control program of the controller 40 using the user interface 78.

Referring now to FIGS. 6 and 7, as previously discussed, the disclosed embodiments allow visualization of the 3-D location of the splices 56 within a composite structure 25 comprising a plurality of plies 92, each formed by multiple tow bands 22 (FIG. 4). As best seen in FIG. 7, the disclosed method and apparatus allow detection and visualization of two or more splices 56 that form undesired alignments through the thickness 138 of the composite structure 25. For example, as shown in FIG. 7, three of the splices 56 are substantially vertically aligned in three adjacent plies 92, in the area designated by the numeral 94a. Similarly, two additional splices 56 in adjacent plies 92 within the area 94b are substantially aligned. Those vertical alignments of splices 56 may reduce the strength of the composite structure 25 in localized areas, and thus are to be avoided.

It may also be desirable to detect and visualize other types of alignments of the splices 56, other than vertical alignments, that may be undesirable, depending upon the direction of loads placed on the composite structure 25. For example, in some applications, it may be desirable to detect and visualize the presence of splices 56 in adjacent plies 92 that are diagonally aligned in a particular direction through the thickness 138 of the structure 25. The disclosed method and apparatus may also be used to map and visualize 3-D distributions of splices 56 other than the simple alignments described above that may affect the performance of a laminate.

Figure 8:
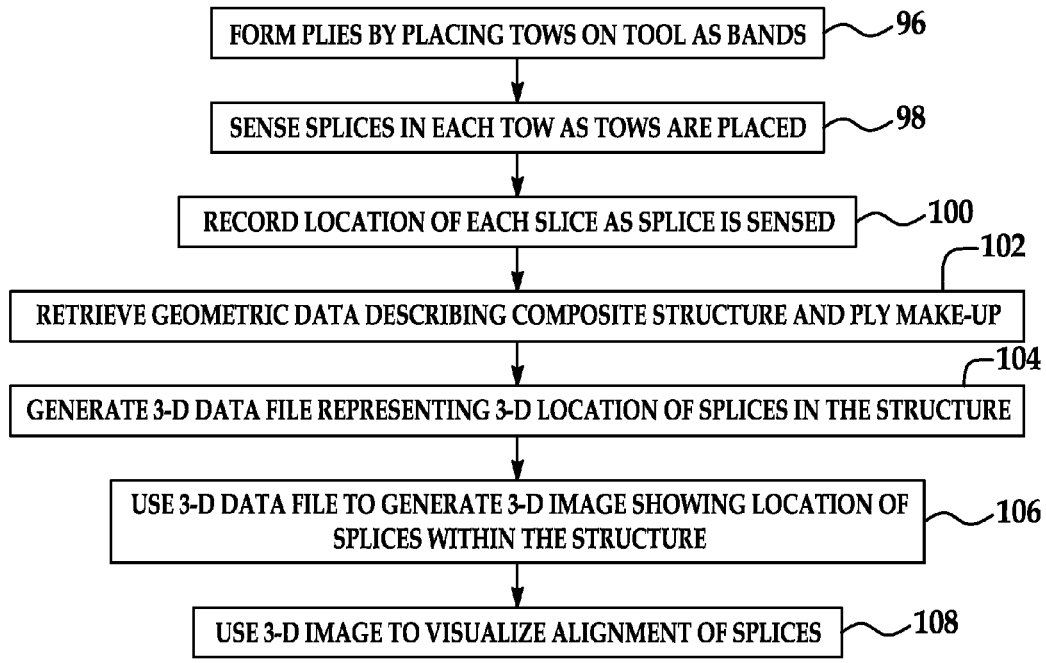
FIG. 8 is a block diagram illustration of the steps of a method for 3-D mapping and visualizing of tow splices in a laminate.

Referring now to FIG. 8, the disclosed method for 3-D mapping and visualizing splices 56 begins at step 96 in which plies 92 are formed by placing the tows 44 as bands 22 on a tool 24 or other substrate. At 98, the splices 56 in each tow 44 are sensed or detected as the tows 44 are being placed on the tool 24. At 100, the location of each detected splice 56 is recorded as the splice 56 is being sensed. Having sensed the splices 56, geometric data describing the composite structure 25 as well as its ply make-up is retrieved at step 102. At 104, a 3-D data file 86 is generated which represents an image showing the 3-D location of the splices 56 within the composite structure 25. At 106, the 3-D data file 86 is used to generate a 3-D image showing the location of the splices within the composite structure 25. As shown at 108, this 3-D image may be used to visualize the alignment of splices 56.

Figure 9:
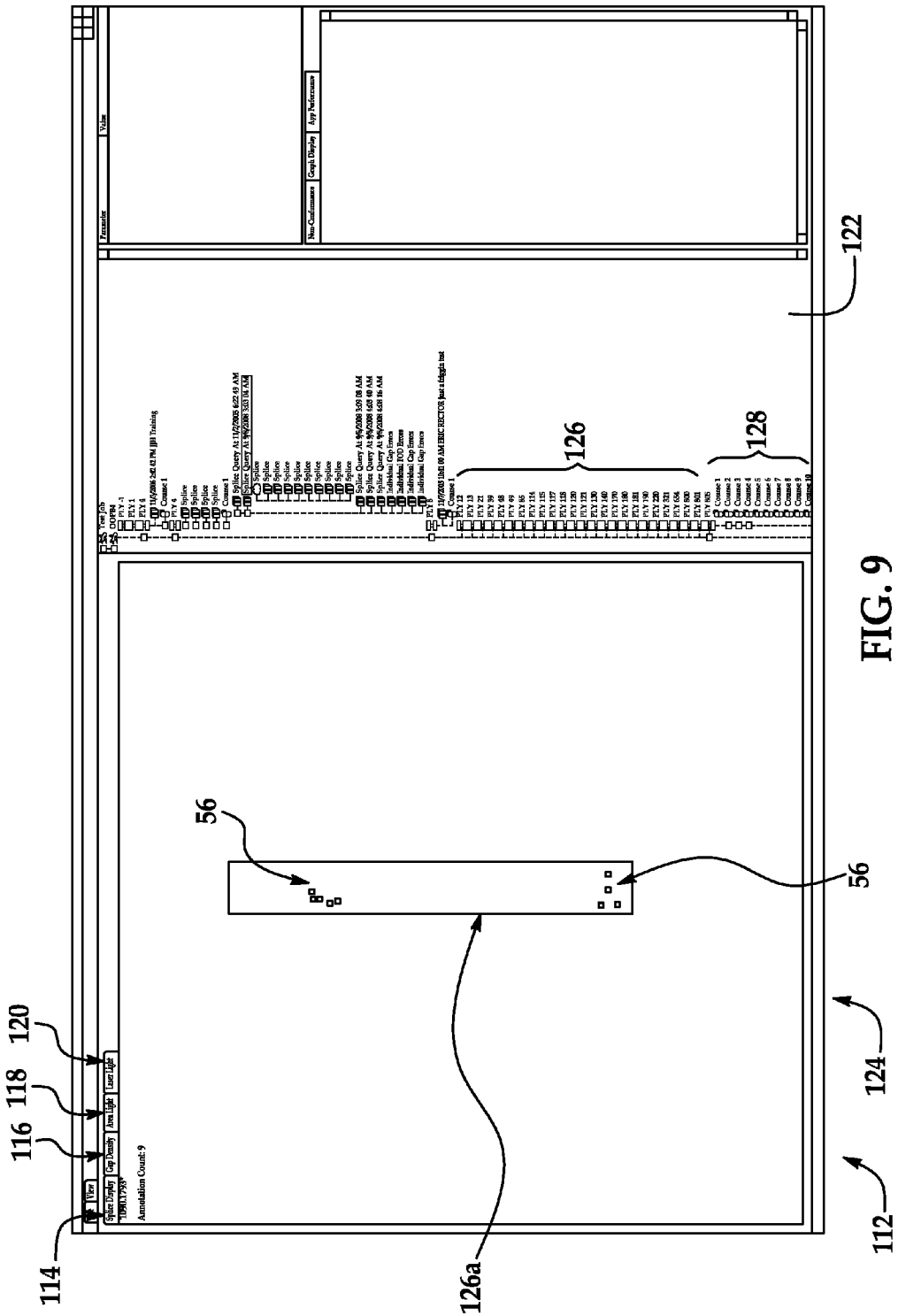
FIG. 9 is an illustration of a computer display screen used to analyze and visualize the locations of tow splices in a composite laminate.

Attention is now directed to FIG. 9 which illustrates a typical computer screen display 112 on the user interface display 82 that may be used to control the machine vision system 65 and to visualize either in two or three dimensions, the location of the splices 56 and the potential splice alignment in three dimensions within the composite structure 25. The screen display 112 includes user selectable screen tabs 114-120 which allow a user to select and display a splice display, gap density, area light and laser light, respectively. The right side 122 of the screen display 112 shows information such as a listing of the plies 126 that may be selected to show the individual courses 128 within each ply 126. The left side 124 of the screen display 112 is employed to display images, which in the case of FIG. 9 is a 2-D display of the splices 56 located within one of the plies 126a displayed on the right side 122 of the screen display 112. As will be discussed below, the left side of the screen 124 may also be used to display a 3-D image of the composite structure showing the 3-D location of the splices 56.

Figure 10:
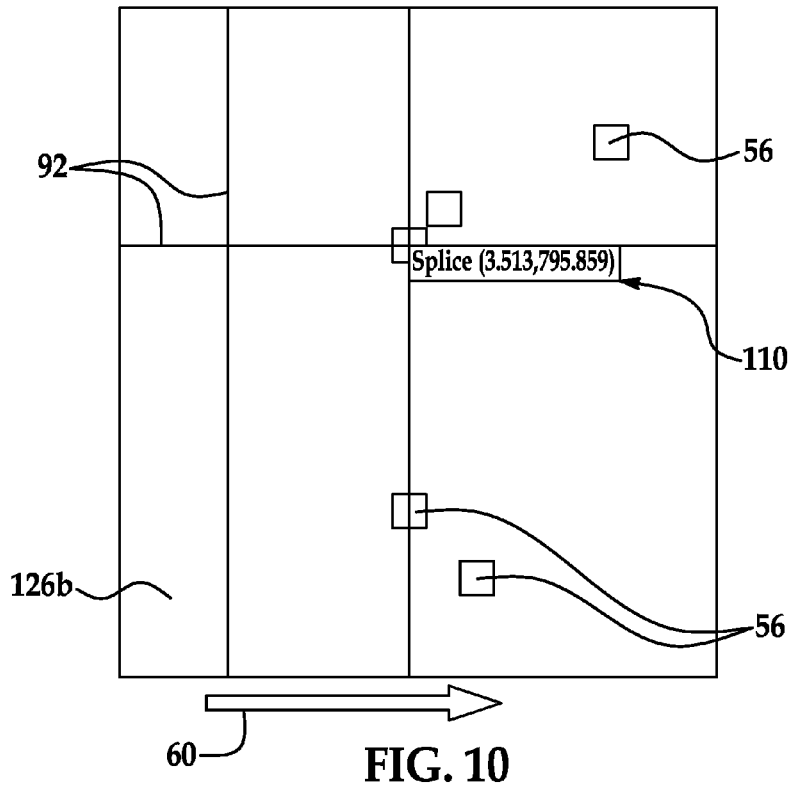
FIG. 10 illustrates a typical computer display screen showing the 2-D position of splice markings within a selected ply of a composite laminate.

FIG. 10 illustrates a 2-D map of a particular ply 126b that is selected and displayed using the screen display 112 in FIG. 9. The 2-D map in FIG. 10 shows the 2-D location of splices 56 in which user controlled crosshairs 92 may be used to select and display at 110, the location of a particular splice 56.

Figure 11:
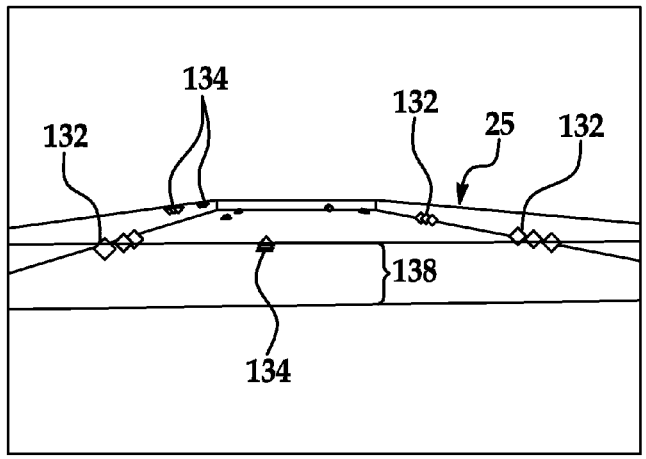
FIGS. 11-13 are user screen displays showing the 3-D location of splices within a composite laminate.
Figure 12:
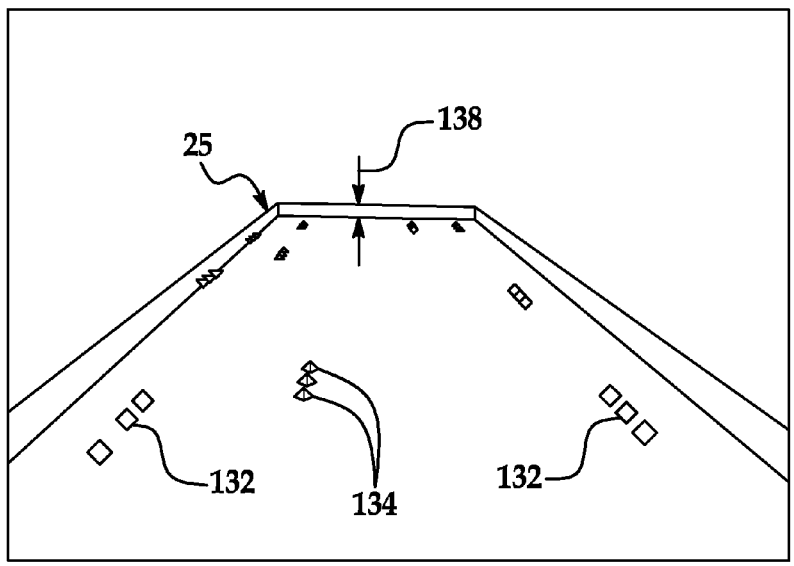
Figure 13:
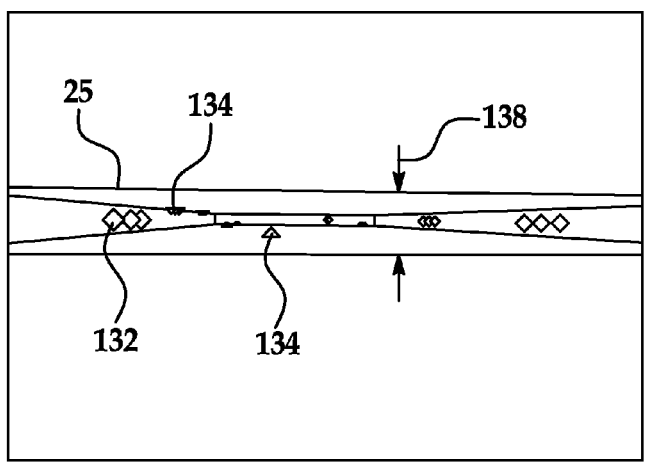

FIGS. 11-13 are typical 3-D images that may be displayed on the left side 124 of the screen display 112 in which the composite structure 25 is represented in outline form in an isometric view showing its thickness 138. In these views, splices 56 are represented by multiple indicia or splice marks and occur in sets of threes, similar to the rectangular splice features 58 shown in FIG. 4. The splice marks occurring in inner plies are represented by full diamonds 132. Truncated diamonds 134 represent splices that occur either on or very near the outer mold-line (outermost) ply, or on or very near the inner mold-line (innermost) ply.

Figure 14:
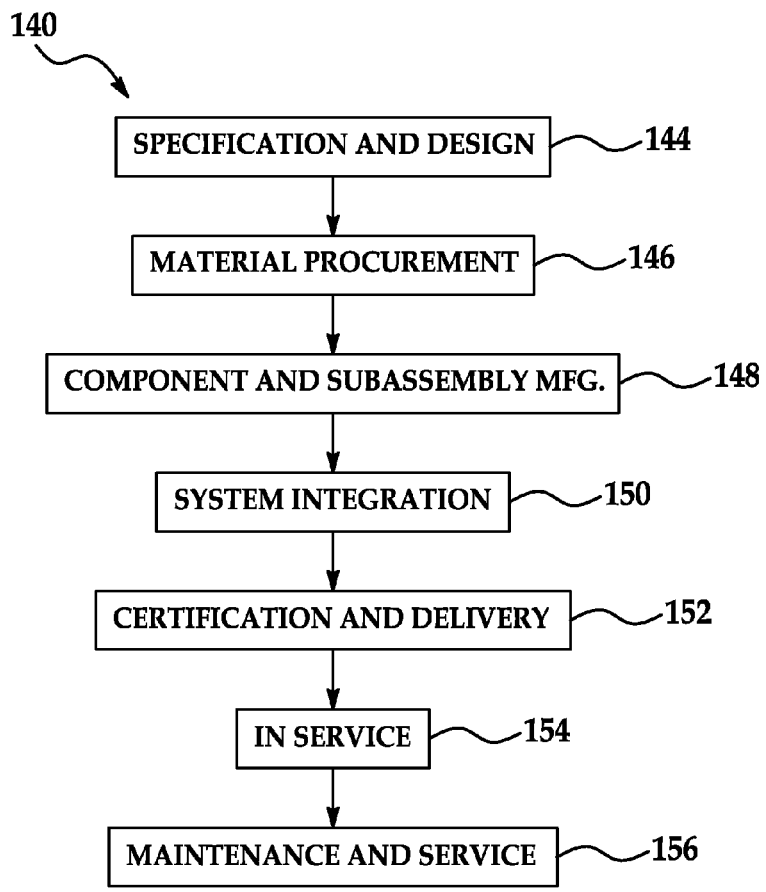
FIG. 14 is an illustration of a flow diagram of aircraft production and service methodology.
Figure 15:
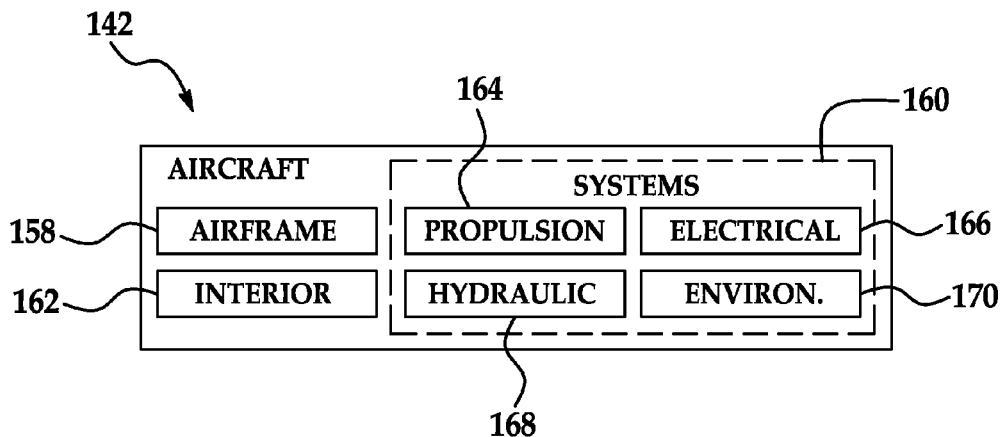
FIG. 15 is an illustration of a block diagram of an aircraft.

Embodiments of the disclosure may find use in a variety of potential applications, particularly in the transportation industry, including for example, aerospace, marine and automotive applications. Thus, referring now to FIGS. 14 and 15, embodiments of the disclosure may be used in the context of an aircraft manufacturing and service method 140 as shown in FIG. 14 and an aircraft 142 as shown in FIG. 15. During pre-production, exemplary method 140 may include specification and design 144 of the aircraft 142 and material procurement 146. The disclosed method may be specified for use in making composite parts during the specification and design 144 of the aircraft 142. During production, component and subassembly manufacturing 148 and system integration 150 of the aircraft 142 takes place. The disclosed method and apparatus may be used to manufacture composite parts during the component and subassembly manufacturing process 148. Thereafter, the aircraft 142 may go through certification and delivery 152 in order to be placed in service 154. While in service by a customer, the aircraft 142 is scheduled for routine maintenance and service 156 (which may also include modification, reconfiguration, refurbishment, and so on). Composite parts manufactured using the disclosed method and apparatus may be installed on the aircraft 142 during the maintenance and service 156.

Each of the processes of method 140 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 142 produced by exemplary method 140 may include an airframe 158 with a plurality of systems 160 and an interior 162. Composite parts manufactured by the disclosed method and apparatus may be used in the airframe 156 and within the interior 162. Examples of high-level systems 160 include one or more of a propulsion system 164, an electrical system 166, a hydraulic system 168, and an environmental system 170. Any number of other systems may be included. Although an aerospace example is shown, the principles of the disclosure may be applied to other industries, such as the marine and automotive industries.

Systems and methods embodied herein may be employed during any one or more of the stages of the production and service method 140. For example, components or subassemblies corresponding to production process 148 may be fabricated or manufactured in a manner similar to components or subassemblies produced while the aircraft 142 is in service. Also, one or more apparatus embodiments, method embodiments, or a combination thereof may be utilized during the production stages 148 and 150, for example, by substantially expediting assembly of or reducing the cost of an aircraft 142. Similarly, one or more of apparatus embodiments, method embodiments, or a combination thereof may be utilized while the aircraft 142 is in service, for example and without limitation, to maintenance and service 156.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of mapping a location of splices in a plurality of tows used to layup a laminated composite structure, comprising:
   placing tows on a tool by using an automatic fiber placement machine comprising a compaction roller, such that placing tows comprises simultaneously placing the plurality of the tows on the tool as a band;
   sensing, using a sensing device, a location of each splice as the plurality of tows are being simultaneously placed as the band during the layup:
   generating, using a software program in a computer, a data file from a geometric database of the composite structure;
   using the computer with a program code for: receiving the data file from the geometric database, determining the location of the splices within the composite structure, the location being a three dimensional (3-D) location, receiving an inspection parameter, and generating a pass/fail status for the plurality of tows based upon the inspection parameter; and,
   using the data file to generate a 3-D display showing the 3-D location of the splices in the composite structure.

2. The method of claim 1, wherein sensing the location of each splice includes optically sensing a presence of a feature on the tows representing the location of a splice.

3. The method of claim 2, wherein:
   sensing the location of each splice further includes illuminating the tows as the tows are being placed, and optically sensing the presence of the feature is performed using a camera.

4. The method of claim 3, wherein:
   the feature includes visual indicia at each of the splices, and optically sensing the presence of the feature includes using the camera to record an image of the indicia.

5. The method of claim 1, wherein generating the data file includes recording the location of each splice in each of a plurality of plies of the structure.

6. A method of laying up a composite structure, comprising:
   placing tows on a tool using an automatic placement machine comprising a compaction roller, said placing comprising simultaneously placing a plurality of the tows on the tool as a band;
   generating, using a software program in a computer, a data file from a geometric database of the composite structure;
   sensing, using a sensing device, splices in each of the tows as the tows of the band are placed on the tool;
   recording, using the computer, a location of each splice as the splice is sensed;
   using the computer with a program code for: receiving the data file from the geometric database, determining a location of the splices within the composite structure, receiving an inspection parameter, and generating a pass/fail status for the plurality of tows based upon the inspection parameter; and
   generating, for a user interface, an image of the structure showing the locations of the splices in the composite structure based on the recorded locations of the splices.

7. The method of claim 6, further comprising:
   illuminating the band as the band is being placed on the tool, and sensing a passage of indicia through a strip across the band.

8. The method of claim 6, wherein recording the location includes recording the two dimensional position of each of the splices in each of a plurality of plies laid up on the tool by the machine.

9. The method of claim 8, further comprising:
using the recorded positions of the splices to generate the data file representing a 3-D image of the locations of each splice in the composite structure.

10. The method of claim 6, wherein sensing splices is performed using sensors mounted on the automatic placement machine.

11. A method of laying up a composite aircraft structure, comprising:
simultaneously placing bands of composite pre-preg tows on a tool using an automatic placement machine, comprising a compaction roller;
using a computer coupled with a sensor for sensing features on each of the tows in the band indicating a presence of a splice on the tow immediately after the tow has been placed on the tool by the placement machine;
using the computer for recording the location of each detected feature within each ply of a lay-up;
using the computer for retrieving geometric information from a geometric database of the composite structure;
using a recorded locations of each splice and the geometric information to generate a data file representing a 3-D location of splices within the composite structure;
and using the data file to generate a 3-D image of the structure showing a location of the splices within the structure.

* * * * *